UNITED STATES PATENT OFFICE.

JAMES C. ANDERSON, OF ALLEGHENY, PENNSYLVANIA.

IMPROVEMENT IN PROCESSES OF MAKING ROOFING-TILES.

Specification forming part of Letters Patent No. 185,277, dated December 12, 1876; application filed October 28, 1876.

*To all whom it may concern:*

Be it known that I, JAMES C. ANDERSON, of Allegheny, Pennsylvania, have invented a new and useful Process in the Manufacture of Roofing-Tile, which process is fully set forth in the following specification:

My invention relates to the molding and forming of roofing-tile from natural clay; and it consists in first reducing the clay to a fine powder, and then, when dry and in the powdered state, subjecting the same to very heavy pressure within steel dies or molds of the desired form of the tile, obviating the objections heretofore experienced in the making of roofing-tiles by forming or molding them from clay mixed with water into a mortar-like paste, which mode was open to the fatal objections of becoming warped or sprung in the burning of the same, and also on account of the large amount of water absorbed and retained in the pores of the clay after the completion of the molding process, which, on being volatilized in the burning process, leaves the tiles honey-combed and brittle, necessitating the forming of the tiles very thick and heavy in order to give them sufficient strength.

In carrying out my invention the clay to be molded is first dried, then ground or crushed to a fine powder, and then passed into steel molds or dies of the desired shape for forming the tiles, and subjected to very heavy pressure or concussion, by which the clay within the molds will be compressed into tiles of the desired form, which form will be retained by the tile after they are taken from the molds. They are then placed in seggars and burned in a potter's kiln. The molecules or atoms of the clay are thus brought into close contact, imparting a dense, solid, and firm texture to the tiles.

By my process the tiles are burned without becoming warped or sprung, and possess great strength, durability, and fineness of finish; and by reason of the greatly-enhanced strength of the tiles they may be made much thinner and lighter than was practicable by the old processes.

Having thus described my invention, what I claim is—

In the manufacture of roofing-tiles, the within-described process of reducing the clay to a fine powder, and then molding the same, when dry, into the form of the tiles by heavy pressure or concussion within the molds or dies, substantially as herein set forth.

J. C. ANDERSON.

Witnesses:
JNO. H. STEVENSON,
D. H. JONES.